United States Patent
Braun et al.

[11] Patent Number: 6,113,499
[45] Date of Patent: Sep. 5, 2000

[54] DRIVE SHAFT

[75] Inventors: Juergen Braun, Remseck; Dieter Kandert, Wiernsheim; Dittmar Wieland, Oppenweiler, all of Germany

[73] Assignee: DaimlerChrysler AG, Germany

[21] Appl. No.: 09/120,186

[22] Filed: Jul. 22, 1998

[30] Foreign Application Priority Data

Jul. 22, 1997 [DE] Germany ............................ 197 31 331

[51] Int. Cl.$^7$ .................................................. F16C 3/00
[52] U.S. Cl. ............................................ 464/140; 464/183
[58] Field of Search .................................. 464/113, 140, 464/98, 179, 182, 901; 403/364, 298

[56] References Cited

U.S. PATENT DOCUMENTS

| 2,064,392 | 12/1936 | Swenson et al. | 464/113 |
|---|---|---|---|
| 4,242,889 | 1/1981 | Muller et al. | 464/113 |
| 4,543,011 | 9/1985 | Lindenthal | 403/364 |
| 4,551,116 | 11/1985 | Krude | 464/183 |
| 4,607,974 | 8/1986 | Brothers et al. | 403/364 |
| 4,747,806 | 5/1988 | Krude et al. | 464/182 |
| 5,431,507 | 7/1995 | Smilanick | 403/364 |
| 5,950,744 | 9/1999 | Hughes | 403/364 |

FOREIGN PATENT DOCUMENTS

| 1 821 165 | 11/1960 | Germany . | |
| 25 34 684 | 2/1977 | Germany . | |
| 37 10 572 | 10/1988 | Germany . | |
| 42 30 639 | 10/1993 | Germany . | |
| 43 10 008 | 9/1994 | Germany . | |
| 354108 | 6/1961 | Switzerland | 464/183 |

OTHER PUBLICATIONS

Juergen Bauer et al., "Leichtbau im Antriebstrang der neuen BMW 5er Baureihe", ATZ Automobiltechnische Zeitschrift, 99 (1997), vol. 5, pp. 256–263.

"Mayers Lexikon der Technik und der exakten Wissenschaften", vol. 2, 1970.

*Primary Examiner*—Anthony Knight
*Assistant Examiner*—Greg Binda
*Attorney, Agent, or Firm*—Evenson, McKeown, Edwards & Lenahan, P.L.L.C.

[57] ABSTRACT

A two-part hollow drive shaft for motor vehicles in a light-weight construction, having two shaft sections and a total of three cardan joints, with a pivot bearing being arranged close to the center cardan joint. For compensating load-change-caused distance changes of the rearward cardan joint from the pivot bearing, a length compensation is provided in the second shaft section. The first shaft section is axially divided in the proximity of the pivot bearing in order to be able to mount the bearing element. For designing the drive shaft to be as light as possible and for being able to produce it at reasonable cost, the center cardan joint is constructed as a disk joint with a flexible ring disk arranged perpendicularly to the axis of rotation. Furthermore, the rearward cardan joint is constructed as a homokinetic cardan joint in a construction which permits an axial length compensation so that a separate length compensation in the rearward shaft section is not necessary. In the area of the axial division of the first shaft section, one toothing respectively with radially extending teeth which toothings engage in one another in a mutually centering and non-rotatable manner is worked onto mutually facing front sides of the hollow shaft, which toothing can be axially braced by a screwed connection arranged in the interior of the hollow shaft. As an alternative, the shaft can be welded at this point also after the mounting of the bearing.

13 Claims, 4 Drawing Sheets

DRIVE SHAFT

BACKGROUND AND SUMMARY OF THE INVENTION

This application claims the priority of German patent 197 31 331.0–12, filed Jul. 22, 1997, the disclosure of which is expressly incorporated by reference herein.

The invention relates to a drive shaft for transmitting power from the transmission to the rear axle of a motor vehicle, for example, from ATZ Automobiltechnische Zeitschrift 99 (1997), Volume 5, Pages 256 to 263. This article relates to light-weight construction in the transmission line and, among other things, also discusses light-weight construction measures on a drive shaft in a concrete embodiment. After a discussion of various conceivable variants, the specific drive shaft is introduced. In its case, the light-weight construction is essentially implemented by using aluminum as the light-weight construction material. On the transmission side, the known drive shaft has a disk joint; in the center, it has a cardan joint; and in the rear, it has an axially inflexible, homokinetic joint. The required length compensation of the drive shaft is integrated into the center cardan joint and is utilized also for mounting the center bearing.

It is an object of the invention to improve a drive shaft such that it can be produced in a particularly light manner and at reasonable cost.

These and other objects have been achieved according to the present invention by providing a two-part drive shaft for transmitting power from a transmission to a rear axle of a motor vehicle, comprising: a first shaft section which originates from the transmission and is constructed as a hollow shaft, said first shaft section having a pivot bearing on an end located away from the transmission; a center cardan joint arranged proximate the end of the pivot bearing located away from the transmission; a second shaft section which adjoins the center cardan joint and is constructed as a hollow shaft; and a rearward cardan joint arranged on an end of the second shaft section for connection to an input shaft of a differential gear of the rear axle, said rearward cardan joint being constructed as a homokinetic cardan joint permitting an axial length compensation, said first shaft section being axially divided proximate the pivot bearing for permitting a mounting of the bearing element constructed as a closed ring-shaped roller bearing, the center cardan joint being constructed as a disk joint with a flexible ring disk arranged perpendicularly to an axis of rotation of the shaft, said flexible ring disk being held between a plurality of flanges provided on the adjoining shaft sections, the axial division of the first shaft section being closable by a connection construction which radially is built up toward the interior.

These and other objects have been achieved according to the present invention by providing a drive shaft for a motor vehicle, comprising: a first hollow shaft section to be coupled to a transmission of the motor vehicle, said first hollow section being divided into two separate parts at an axial division proximate a location for a supporting bearing for the first shaft section; a second hollow shaft section to be coupled to a differential of the motor vehicle; a disk joint interposed between said first and second hollow shaft sections; and a connector for holding said two separate parts of the first hollow shaft section together, said connector being threadedly engaged with a first of said two separate parts, said connector defining a sloped shoulder which engages a corresponding sloped shoulder of a second of said two separate parts.

These and other objects have also been achieved according to the present invention by providing a connection for two hollow shaft sections of a drive shaft for a motor vehicle, comprising: a hollow shaft section to be coupled to a transmission of the motor vehicle, said hollow section being divided into two separate parts at an axial division proximate a location for a supporting bearing for the shaft section; and a connector for holding said two separate parts of the hollow shaft section together, said connector being threadedly engaged with a first of said two separate parts, said connector defining a sloped shoulder which engages a corresponding sloped shoulder of a second of said two separate parts.

These and other objects have also been achieved according to the present invention by providing a method of assembling a hollow drive shaft of a motor vehicle, said method comprising: coupling a first piece of a first hollow shaft section to a transmission of the motor vehicle; arranging a pivot bearing to support an end of the first piece of the first hollow shaft section located opposite said transmission; arranging a second piece of said first hollow shaft section in engagement with said first piece of said first hollow shaft section; inserting a connector into an interior of said first and second pieces, threadedly engaging said connector with said first piece such that a sloped shoulder of said connector abuttingly engages a sloped shoulder of said second piece; and coupling a second hollow shaft section to said first hollow shaft section with a disk joint interposed therebetween.

In the case of the solution of the invention, independently of a selection of material for the individual drive shaft components, the light-weight construction is achieved mainly by a skillful constructive combination of joints. By using a homokinetic joint with an integrated length compensation, a separate length compensation is not necessary. The possibility of mounting the center bearing is achieved by a closable axial shaft division—in the simplest case, by means of a friction welding. In the case of an elongated installation position, the center cardan joint may be constructed as a light-weight disk joint.

Other objects, advantages and novel features of the present invention will become apparent from the following detailed description of the invention when considered in conjunction with the accompanying drawings.

DETAILED DESCRIPTION OF THE DRAWINGS

Figure 1:
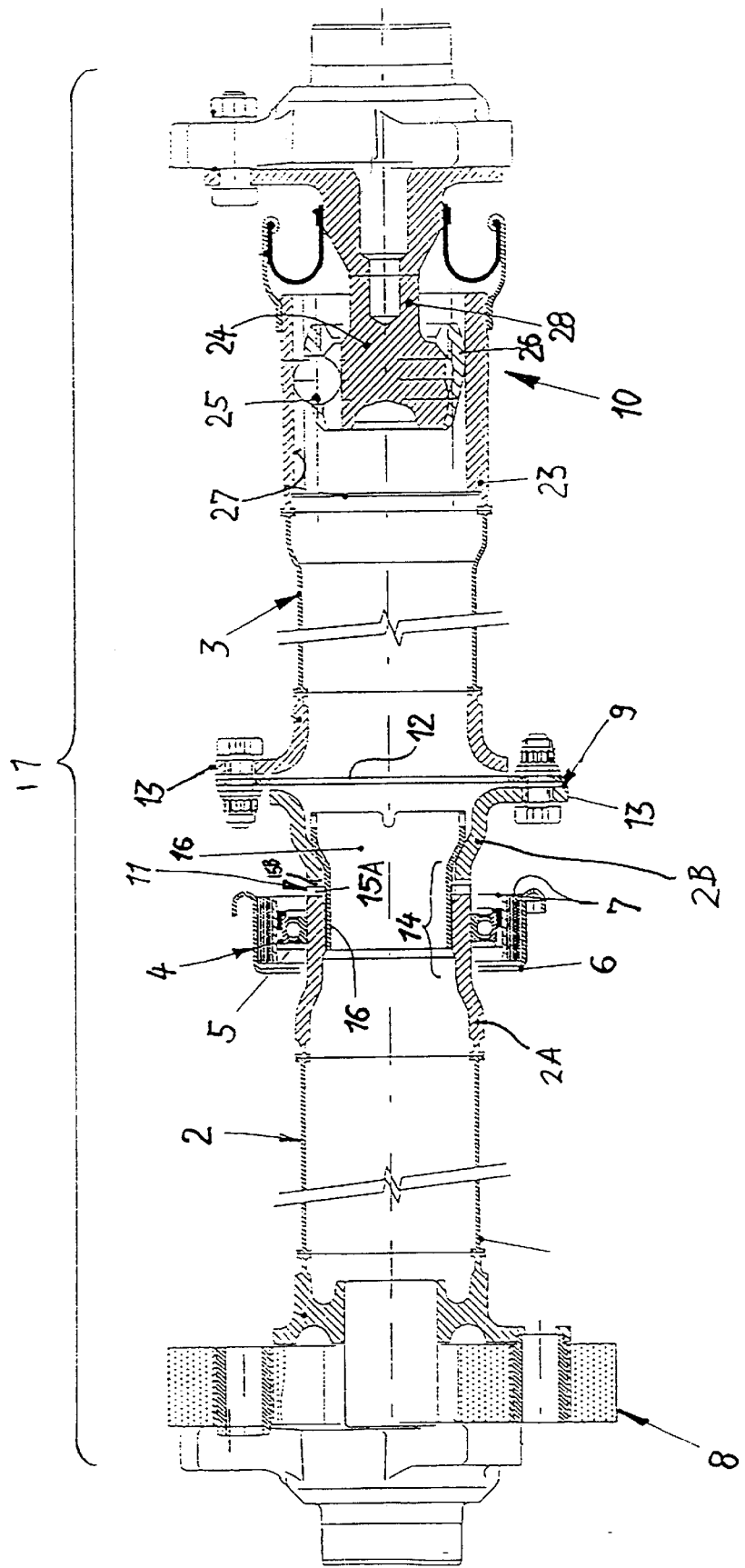
FIG. 1 is a longitudinal sectional view of a light-weight drive shaft for motor vehicles according to a preferred embodiment of the present invention.

The illustrated preferred embodiments show a two-part drive shaft 1 for transmitting power from the transmission 8 to the rear axle of a motor vehicle. A first shaft section 2 constructed as a hollow shaft originates from the motor vehicle transmission after a transmission-side cardan joint. In the area of its end facing away from the transmission, a pivot bearing 4 of the first shaft section is provided, and, on the other side of the pivot bearing but in its proximity, a center cardan joint 9 is provided. The center cardan joint is adjoined by the second shaft section 3 which is also constructed as a hollow shaft. On the end of the second shaft section, the rearward cardan joint 10 is arranged for the connection to the input shaft of the differential gear of the driven rear axle of the motor vehicle.

In the proximity of the pivot bearing 4, the first shaft section 2 is axially divided in order to be able to mount the bearing element of the pivot bearing which is constructed as a closed ring-shaped roller bearing. The pivot bearing 4 in the area of the shaft center consists essentially of a roller bearing 5 which is constructed as a closed component and which, by way of an elastic intermediate layer 7, is embedded in a bearing block 6 which itself is screwed or otherwise attached to the vehicle floor. On the one hand, the elastic intermediate layer is to keep vibrations of the rotating drive shaft away from the vehicle body; thus to acoustically uncouple shaft-side excitations in the hearing range and, in addition, permit an axial or radial lift or movement of the shaft with respect to the vehicle body.

In order to design the drive shaft particularly light in weight and to be able to manufacture it at reasonable cost, according to the invention, the center cardan joint 9 is constructed as a so-called disk joint with a flexible ring disk 12 which is arranged perpendicularly to the axis of rotation and on whose circumference a plurality, for example three, finger flanges 13 of the adjoining shaft sections are fastened. The fingers of the opposite finger flanges 13 are arranged on this and the opposite side in a mutually staggered manner. Such a disk joint is significantly lighter than a previously used cardan joint. According to certain preferred embodiments, the drive shaft is installed into the vehicle such that all cardan joints of the drive shaft are at least approximately aligned with one another; that is, are at an angle of not more than approximately ±1°, although the invention is not limited to such a range. In the case of this preferred installation position, as the result of the operation, only small bending angles occur at the cardan joints which can easily be tolerated also by a disk joint.

With the elimination of a separate length compensation within one of the shaft sections, the rearward cardan joint 10, as a homokinetic cardan joint, is constructed such that it permits an axial length compensation within the joint itself. The rearward cardan joint 10 consists of an exterior joint ring 23 with internally worked-in ball races 27; of a joint hub 24 also with ball races; of driving balls 25 which engage in the two; and of a cage 26 carrying the balls. Because of the axial length compensation, the joint ring 23 is relatively long; that is, it has a length/diameter ratio of more than one in the illustrated preferred embodiment. The joint hub 24 is correspondingly held on the rear-axle-side joint flange by way of a long neck 28. The illustrated type of homokinetic cardan joints with a joint-integrated axial length compensation is known per se. It is used here in a meaningful combination and as a further development with a particularly large length compensation.

In the case of the previously customary, axially inflexible cardan joints, a high-expenditure, heavy sliding piece still had to be provided in one of the shaft sections. This sliding piece permitted the mounting of the pivot bearing of the drive shaft and was therefore considered to be absolutely necessary. For the mountability of the bearing, in the case of the drive shaft according to the invention, the first shaft section 2 is axially divided in the area of the tube wall of the hollow shaft in the proximity of the pivot bearing 4 at an axial division 11 into a first piece 2A and a second piece 2B. After the bearing has been mounted, this division can be closed against in different manners.

Figure 4:
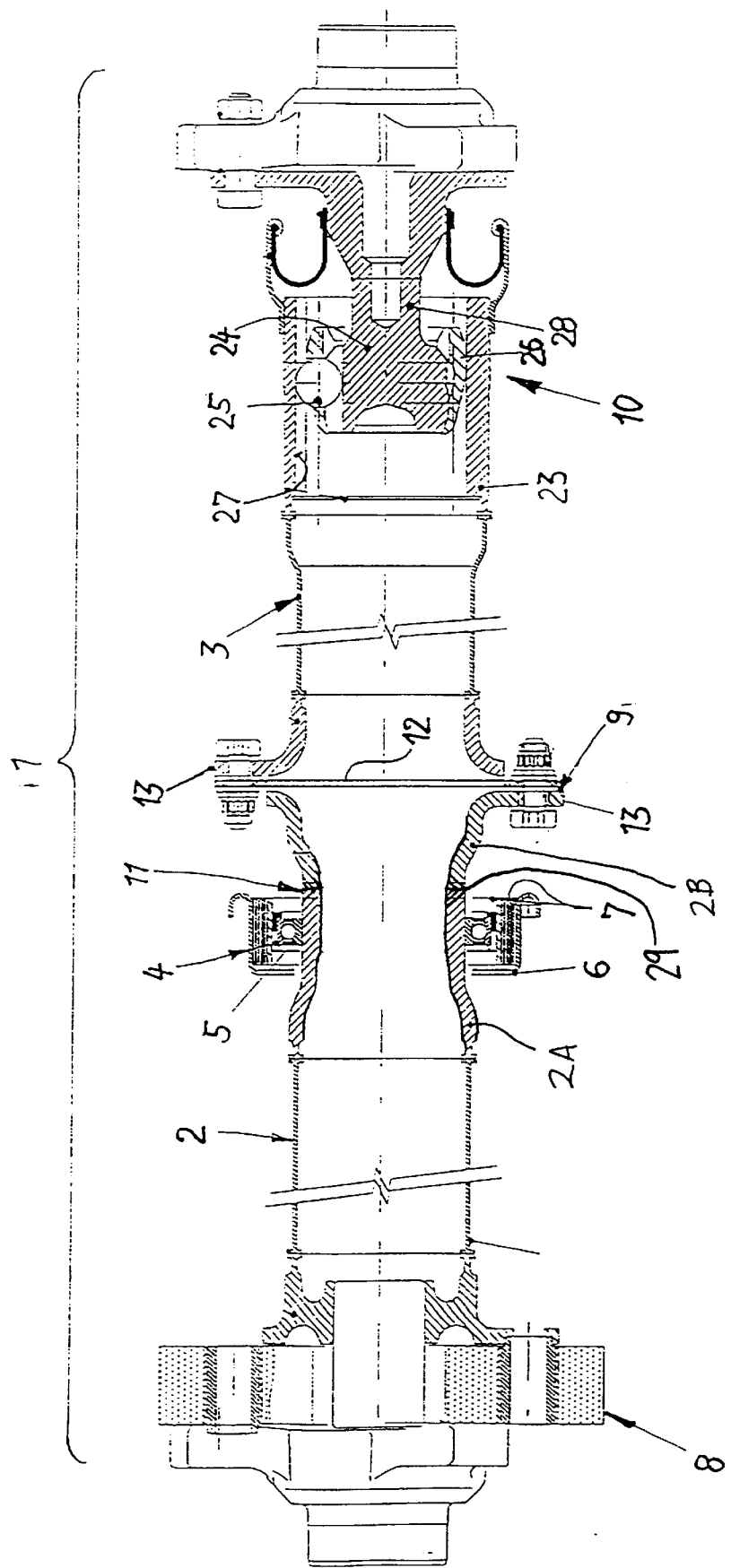
FIG. 4 is a longitudinal sectional view of a light-weight drive shaft for motor vehicles according to another preferred embodiment of the present invention in which the hollow shaft is welded at the axial division.

In the simplified case of a non-repairable throw-away solution shown in FIG. 4, the mutually facing front sides of the axially divided tube wall of the hollow shaft can be connected with one another by a welded connection 29, preferably by a friction welded connection, which is provided after the pivot bearing has been mounted.

Figure 2:
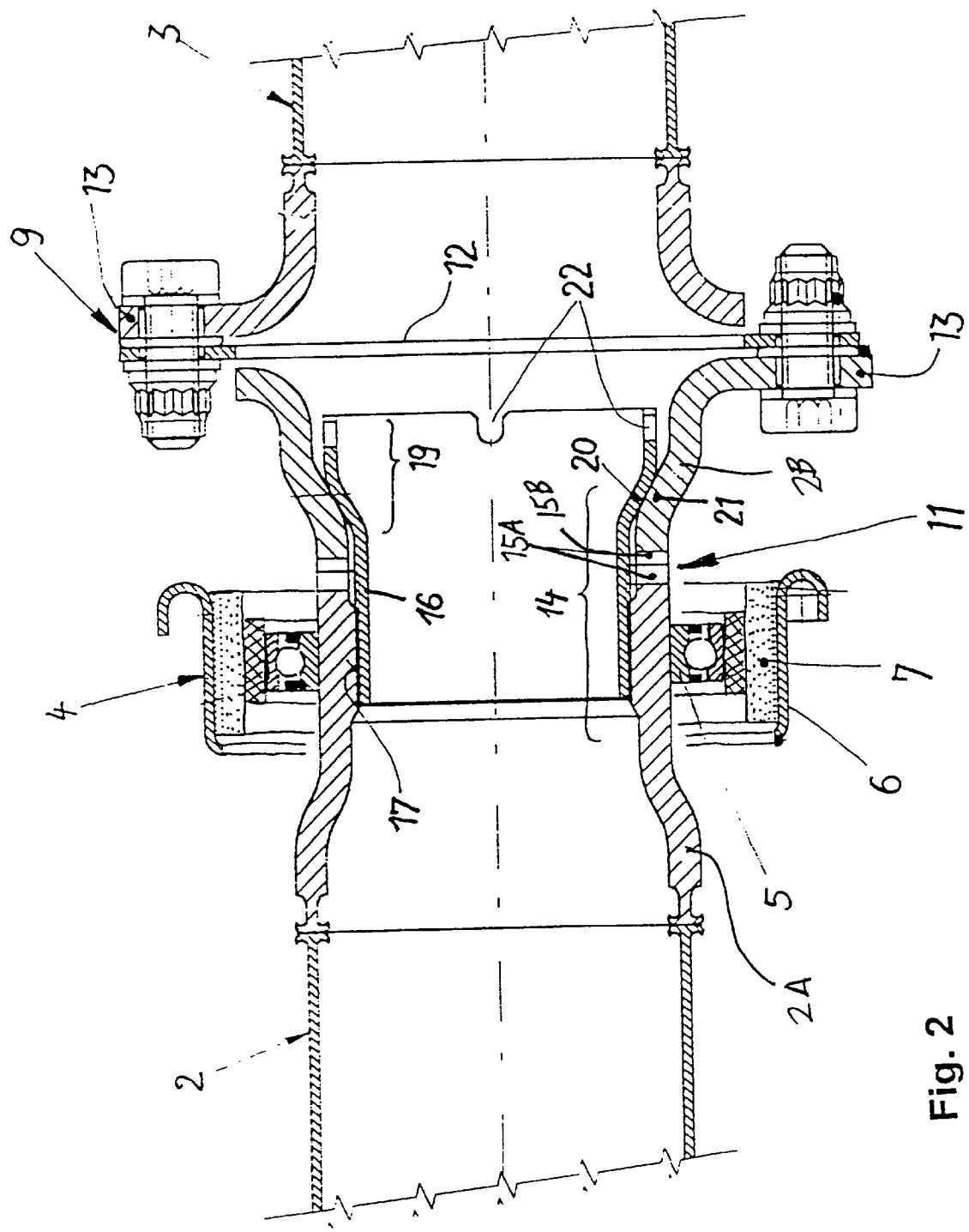
FIG. 2 is an enlarged view in the area of the axial division of the hollow shaft and the pivot bearing of FIG. 1.
Figure 3:
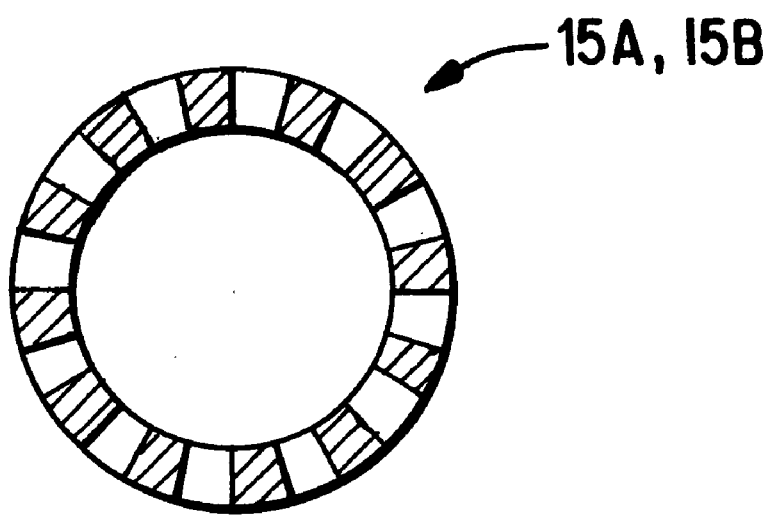
FIG. 3 is an axial end view of the toothing at the axial division of the hollow shaft.

The embodiment illustrated in FIGS. 1–3 implements a detachable and thus repairable connection 14 of the first and second shaft parts 2A, 2B of the first shaft section 2. Teeth 15A, 15B (e.g., gear-type toothings) are provided on mutually facing axial ends of the first and second shaft parts 2A, 2B, respectively. The teeth 15A of the first shaft part 2A engages the teeth 15B of the second shaft part 2B, in a mutually centering and non-rotatable manner. The teeth 15A, 15B are worked onto the mutually facing axial ends of the first and second shaft parts 2A, 2B at the axial division 11, for example according to the so-called "Hirth-type" serrations with radially extending teeth. See, e.g., "Mayers Lexikon der Technik und der exakten Wissenschaften", Vol. 2, 1970. FIG. 3 is a schematic axial end view of the teeth 15A, 15B, which may be viewed as either of the first shaft part 2A or the second shaft part 2B, since the teeth may be identical.

The teeth 15A, 15B are axially tensioned via a screwed connection 14 arranged in the interior of the hollow shaft. The axial screwed connection and tensioning of the teeth is caused in the example by a centrically situated tube-shaped female screw 16. A nut-type thread 17 is worked into the interior of the part of the first shaft section 2 situated farther away from the center cardan shaft, in which nut-type hollow thread 17 the "shaft" of the tube-shaped female screw engages which is provided with a corresponding bolt-type thread (i.e., on its exterior surface).

The wall of the hollow "shaft" of the tube-shaped female screw, while the wall thickness is approximately the same, changes in a rounded manner into the hollow "head" 19 of the hollow screw and forms a sloped shoulder 20. In the interior of the pertaining flange-side portion of the first shaft section, a correspondingly sloped countershoulder 21 is provided. Because of this further development with conical contact surfaces and hollow components, a high component elasticity is created which in view of the axial bracing of the teeth 15 is utilized as an elasticity reserve and as a prestressing force reserve. The free edge of the tube-shaped "head" 19 of the female screw 16 which points axially toward the center cardan joint is provided on the front side with notches 22, which are arranged in a regularly distributed manner, as form closure surfaces for the application of a wrench during the tightening and loosening of the screw. As a result, the female screw 16 can be tightened by means of a rod-type long wrench which axially penetrates through the second shaft section and, as required, can be released again. It is a prerequisite in this respect that the rearward joint 10 was previously demounted; that is, the joint ring 23 is open.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Two-part drive shaft for transmitting power from a transmission to a rear axle of a motor vehicle, comprising:

a first shaft section which originates from the transmission and is constructed as a hollow shaft, said first shaft section having a pivot bearing on an end located away from the transmission;

a center cardan joint arranged proximate the end of the pivot bearing located away from the transmission;

a second shaft section which adjoins the center cardan joint and is constructed as a hollow shaft; and a rearward cardan joint arranged on an end of the second shaft section for connection to an input shaft of a differential gear of the rear axle, said first shaft section being axially divided proximate the pivot bearing for permitting a mounting of the bearing element, the center cardan joint being constructed as a disk joint with a flexible ring disk arranged perpendicularly to an axis of rotation of the shaft, said flexible ring disk being held between a plurality of flanges provided on the adjoining shaft first and second sections, the axial division of the first shaft section being closable by a connection construction.

2. Drive shaft according to claim 1, wherein one teeth respectively with radially extending teeth, which teeth engage in one another in a mutually centering and non-rotatable manner, is worked onto the mutually facing front sides of the axially divided tube wall of the first hollow shaft, which teeth can be axially tensioned via a screwed connection arranged in the interior of the second shaft section.

3. Drive shaft according to claim 2, further comprising a centrically situated, tube-shaped female screw to cause axial tensioning of the teeth.

4. Drive shaft according to claim 3, wherein a wall of the female screw has an approximately constant wall thickness, said female screw having a smaller diameter portion changing in a rounded manner to a larger-diameter head with a sloped shoulder therebetween, an interior of the first shaft section being provided with a correspondingly sloped shoulder.

5. Drive shaft according to claim 4, wherein a free edge of the head of the female screw pointing axially toward the center cardan joint is provided on the front side with notches, which are arranged in a regularly distributed manner, as form closure surfaces for receiving a wrench during the tightening and loosening of the screwed connection.

6. Drive shaft according to claim 1, wherein mutually facing front sides of the axially divided first shaft section are connected with each other by a welded connection, provided after the mounting of the pivot bearing.

7. Drive shaft according to claim 6, wherein said welded connection is a friction welded connection.

8. Drive shaft according to claim 1, wherein the drive shaft is installed such that at least a transmission-side cardan joint and the center cardan joint of the drive shaft are at least approximately aligned with one another at an angle of not more than approximately ±1°.

9. A drive shaft for a motor vehicle, comprising:

a first hollow shaft section to be coupled to a transmission of the motor vehicle, said first hollow section being divided into two separate parts at an axial division proximate a location for a supporting bearing for the first shaft section;

a second hollow shaft section to be coupled to a differential of the motor vehicle;

a disk joint interposed between said first and second hollow shaft sections; and a connector for holding said two separate parts of the first hollow shaft section together, said connector being threadedly engaged with a first of said two separate parts, said connector defining a sloped shoulder which engages a corresponding sloped shoulder of a second of said two separate parts.

10. A drive shaft according to claim 9, wherein said two separate parts of the first hollow shaft section define two teeth, respectively, located at said axial division, said two teeth being engageable with each other in a mutually centering and non-rotatable manner.

11. A connection for two hollow shaft sections of a drive shaft for a motor vehicle, comprising:

a hollow shaft section to be coupled to a transmission of the motor vehicle, said hollow section being divided into two separate parts at an axial division proximate a location for a supporting bearing for the shaft section; and a connector for holding said two separate parts of the hollow shaft section together, said connector being threadedly engaged with a first of said two separate parts, said connector defining a sloped shoulder which engages a corresponding sloped shoulder of a second of said two separate parts.

12. A connection according to claim 11, wherein said two separate parts of the hollow shaft section define two teeth, respectively, located at said axial division, said two teeth being engageable with each other in a mutually centering and non-rotatable manner.

13. A method of assembling a hollow drive shaft of a motor vehicle, said method comprising:

coupling a first piece of a first hollow shaft section to a transmission of the motor vehicle;

arranging a pivot bearing to support an end of the first piece of the first hollow shaft section located opposite said transmission;

arranging a second piece of said first hollow shaft section in engagement with said first piece of said first hollow shaft section;

inserting a connector into an interior of said first and second pieces, threadedly engaging said connector with said first piece such that a sloped shoulder of said connector abuttingly engages a sloped shoulder of said second piece; and coupling a second hollow shaft section to said first hollow shaft section with a disk joint interposed therebetween.

* * * * *